United States Patent
Unterdörfer et al.

(10) Patent No.: US 8,669,001 B2
(45) Date of Patent: Mar. 11, 2014

(54) DEVICE FOR COMBINING AND HOUSING POWER STORAGE CELLS

(75) Inventors: Jens Unterdörfer, Berlin (DE); Peter Birke, Glinicke/Nordbahn (DE); Swen Wiethoff, Berlin (DE); Michael Keller, Baden-Baden (DE)

(73) Assignee: Temic Automotive Electric Motors GmbH (DE)

( * ) Notice: Subject to any disclaimer, the term of this patent is extended or adjusted under 35 U.S.C. 154(b) by 856 days.

(21) Appl. No.: 12/529,754

(22) PCT Filed: Mar. 5, 2008

(86) PCT No.: PCT/DE2008/000378
§ 371 (c)(1),
(2), (4) Date: Dec. 4, 2009

(87) PCT Pub. No.: WO2008/106948
PCT Pub. Date: Sep. 12, 2008

(65) Prior Publication Data
US 2010/0104933 A1    Apr. 29, 2010

(30) Foreign Application Priority Data
Mar. 5, 2007   (DE) .................. 10 2007 011 863

(51) Int. Cl.
*H01M 10/50*   (2006.01)
(52) U.S. Cl.
USPC ........................................ 429/120
(58) Field of Classification Search
None
See application file for complete search history.

(56) References Cited

U.S. PATENT DOCUMENTS

| | | | | |
|---|---|---|---|---|
| 6,033,800 A | * | 3/2000 | Ichiyanagi et al. | 429/176 |
| 2002/0136042 A1 | * | 9/2002 | Layden et al. | 363/146 |
| 2005/0037259 A1 | | 2/2005 | Maruyama | |
| 2005/0048348 A1 | | 3/2005 | Bazzarella | |
| 2005/0231158 A1 | * | 10/2005 | Higashino | 320/112 |
| 2006/0177733 A1 | * | 8/2006 | Ha et al. | 429/159 |
| 2006/0183017 A1 | * | 8/2006 | Kanai | 429/120 |

FOREIGN PATENT DOCUMENTS

| | | |
|---|---|---|
| CN | 1178034 | 4/1998 |
| CN | 1659722 | 8/2005 |
| DE | 103 52 046 A1 | 6/2005 |
| DE | 10352046 A1 * | 6/2005 |
| EP | 1 630 896 A | 3/2006 |

OTHER PUBLICATIONS

Translation of DE 10352046 A1.*
Translation of DE 10352046 A1, Jun. 9, 2005.*
Chinese Office Action dated Jul. 25, 2011 (w/translation).

* cited by examiner

*Primary Examiner* — Ula C Ruddock
*Assistant Examiner* — Daniel Gatewood
(74) *Attorney, Agent, or Firm* — RatnerPrestia

(57) ABSTRACT

A device for joining and storing energy storage cells having a flexible envelope and which are arranged in a rigid housing having a window opening on a planar side thereof and two openings for the metallic current leads of the energy storage cell.
The device includes a sheet metal frame in which the energy storage cells are inserted and in which a heat sink is arranged.

8 Claims, 3 Drawing Sheets

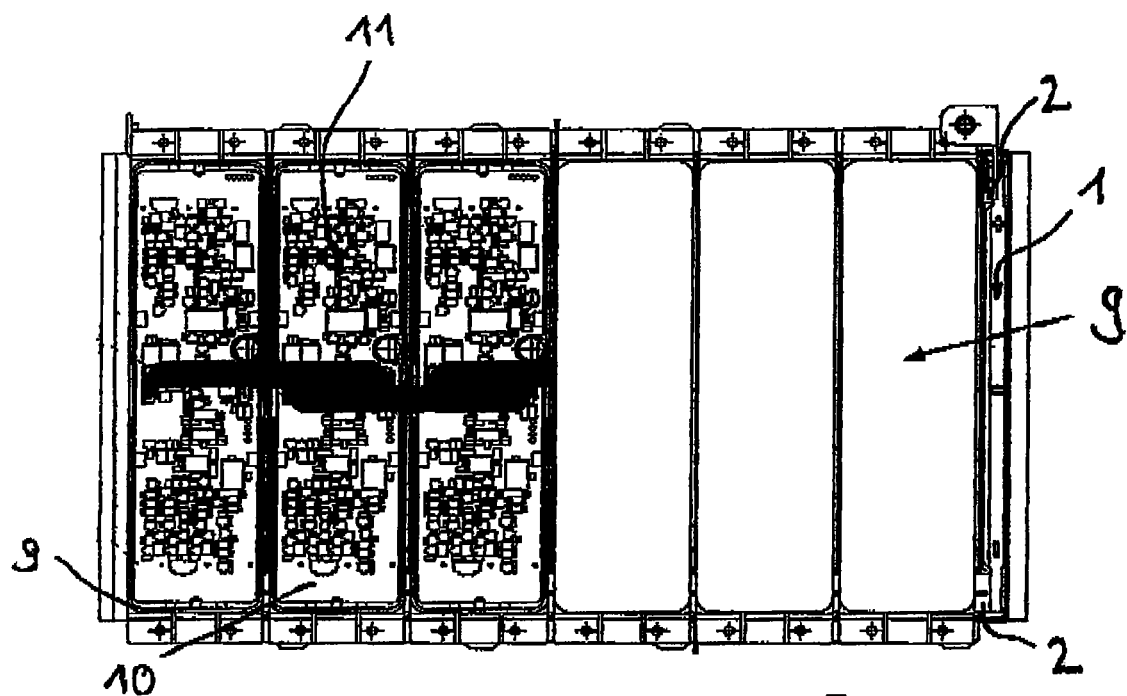
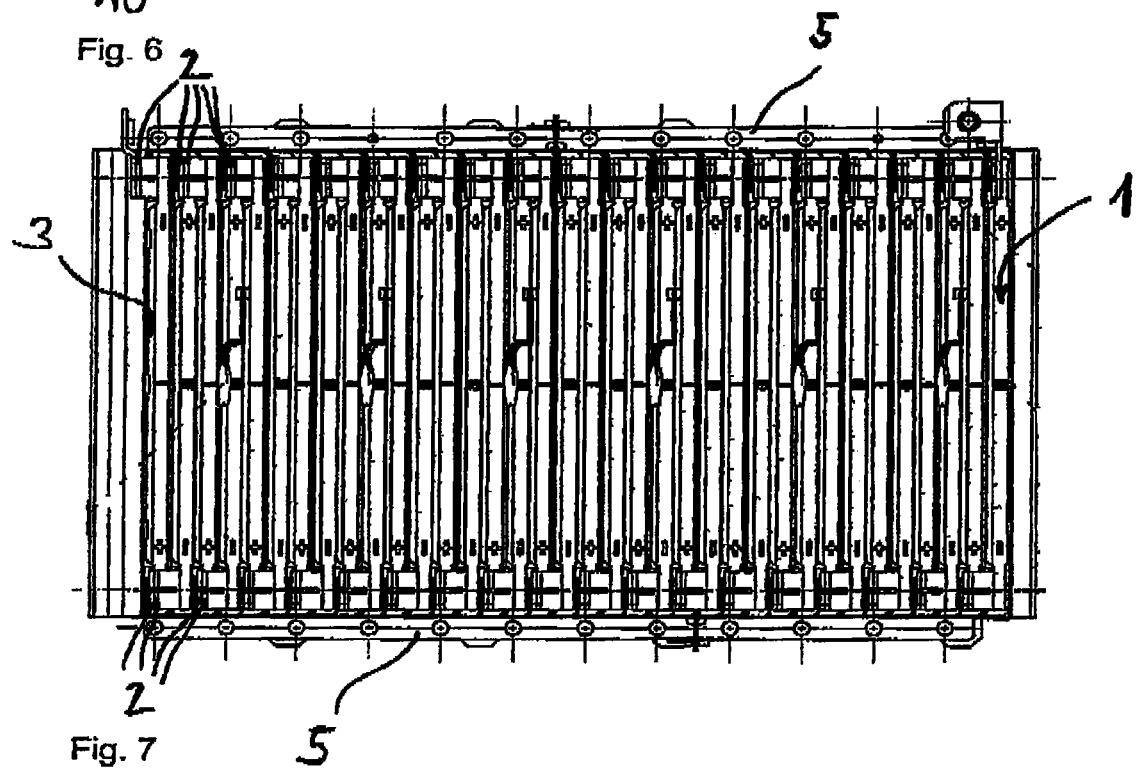
Fig. 6
Fig. 7

DEVICE FOR COMBINING AND HOUSING POWER STORAGE CELLS

CROSS REFERENCE TO RELATED APPLICATIONS

This application is the U.S. national phase application of PCT International Application No. PCT/DE2008/000378, filed Mar. 5, 2008, which claims priority to German Patent Application No. 10 2007 011 863.7, filed Mar. 5, 2007, the contents of such applications being incorporated by reference herein.

BACKGROUND OF THE INVENTION

1. Field of the Invention

The invention refers to a device for joining and storing energy storage cells.

2. Description of the Related Art

Hybrid and electric vehicles need large amounts of electrical energy in order to be able to run an electric machine. Nickel metal hydride cells or lithium ion cells are preferably used as energy stores here. One possibility to design lithium ion cells is in the form of a prismatic soft pack. In this design, the cell is enclosed by a flexible envelope, typically made of an aluminium composite film. Such energy storage cells are arranged in a housing made of a material whose rigidity is higher than that of the envelope to increase their mechanical stability.

SUMMARY OF THE INVENTION

An object of the present invention is to position several individual energy storage cells, each of which is located in a rigid housing, in a stable manner for arrangement in a hybrid or electric vehicle while ensuring a constant temperature.

This object is achieved by means of a housing.

The device serves to join and store energy storage cells having a flexible envelope. In order to increase the mechanical stability of the individual energy storage cells, each of these is arranged in a housing made of a material whose rigidity is higher than that of the envelope. The housing has two openings for the metallic current leads of the energy storage cell and a window opening on a planar side thereof. The window opening enables necessary movements of the flexible envelope during operation of the energy storage cell which are due to increases and reductions in volume of the interior of the energy storage cell.

The device comprises a sheet metal frame in which the energy storage cells are inserted for joining and storing the energy storage cells. A heat sink for cooling the energy storage cells is arranged completely or partly within the sheet metal frame.

The advantage of this invention is the compact structure of the cell block formed of the energy storage cells having a flexible envelope. Another advantage is the variability of the cell block length thanks to the modular structure of the cell block. A desired number of energy storage cells can thus be joined in one or more cell blocks and installed depending on the installation space available. The heat sink enables the energy storage cells to be operated at a desired temperature and increases the service life of the energy storage cells and therefore the safety of the energy store.

In an advantageous embodiment, at least one circuit board with a charge redistribution circuit is arranged within the sheet metal frame. The charge redistribution circuit redistributes charge between all or a group of energy storage cells. The charge redistribution circuit can be a balancing circuit. But it can also be a circuit which takes into account the different degree of aging of the individual energy storage cells and charges and discharges these to a different extent. The advantage of this embodiment is the increase in service life of the entire energy store while the cell block with the corresponding electronics has a very compact structure.

According to another advantageous embodiment, the energy storage cells, which are inserted in the sheet metal frame and arranged in rigid housings, are welded to each other on the current leads. This type of connection has the advantage of a reliable electronic contact of the energy storage cells, which are connected in series in this way. In addition, the mechanical stability of the cell block is increased.

For the purpose of electrical insulation, an electrically insulating foil is affixed to the inside of the sheet metal frame at the same height as the current leads of the energy storage cells in another advantageous embodiment. The foil is preferably made of polyimide, but it can also consist of other polymeric foils which are sufficiently insulating. The advantage of this embodiment is the electrical insulation of the current leads and the sheet metal frame, which is highly recommended for safety reasons and needs little space.

According to another advantageous embodiment, the sheet metal frame consists of two metal sheets, each of which is bent into a U-shape having angles of 90 degrees. The two metal sheets are connected to each other such that a frame enclosing a rectangular area is obtained. The two metal sheets can preferably be screwed to each other. This embodiment enables a stable frame to be constructed of just two metal sheets.

In an advantageous embodiment, U-shaped sheet metal flaps can be cut out of the lateral metal sheets of the sheet metal frame at regular intervals and bent inwards. In this way, grooves are formed into which the energy storage cells arranged in rigid housings are inserted. In this way, the energy storage cells are positioned precisely within the sheet metal frame.

In another advantageous embodiment, springs are arranged within the sheet metal frame in order to position the energy storage cells arranged in rigid housings. The springs can preferably define the distances between two energy storage cells within the housing. The advantage of this embodiment is the increased stability and optimized positioning of the cell arrangement.

BRIEF DESCRIPTION OF THE DRAWINGS

Exemplary embodiments of the invention will now be explained in more detail with reference to the drawings in which:

FIG. 6 shows an arrangement of circuit boards with charge redistribution circuits within the sheet metal frame, FIG. 7 shows energy storage cells inserted in a sheet metal frame.

DETAILED DESCRIPTION OF THE PREFERRED EMBODIMENT

Figure 1:
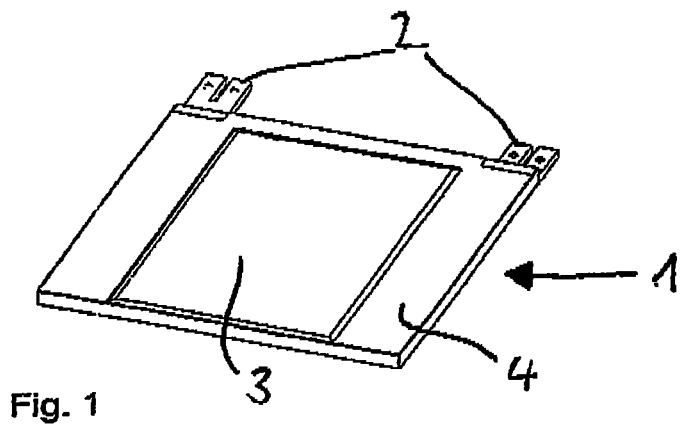
FIG. 1 shows a housing with an energy storage cell placed therein.

The illustration in FIG. 1 shows an energy storage cell (1) having a flexible envelope (3) and two current leads (2). The energy storage cell (1) is enclosed by a housing (4) made of a material whose rigidity is higher than that of the envelope (3) of the energy storage cell, which housing has two openings for the current leads (2) and a window opening on a planar side thereof. The window opening enables the energy storage cell (1), which works in a dynamic fashion, to "breathe". "Breathing" refers to increases and reductions in volume of the interior of the energy storage cell (1) and corresponding movements of the flexible envelope (3). The housing (3) is electrically insulated from the current leads (2) of the energy storage cell (1).

Figure 2:
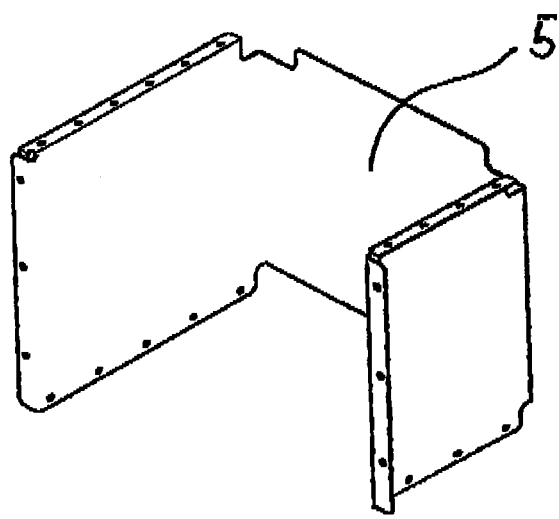
FIG. 2 shows a metal sheet which has been into a U-shape having angles of 90 degrees.

FIG. 2 shows a first preferred exemplary embodiment of a metal sheet (5) used to construct the sheet metal frame. The illustrated metal sheet (5) is bent into a U-shape having two angles of 90 degrees. A second metal sheet which is also bent into a U-shape having angles of 90 degrees is connected to the first one to obtain a sheet metal frame enclosing a rectangular inner area. In the embodiment variant shown the U-shaped metal sheet (5) is bent outwards at angles of 90 degrees and provided with boreholes on both parallel ends. In this way, the two metal sheets can be screwed to each other thus forming the frame. The illustration shows further boreholes in the lower part of the metal sheet (5), which serve to attach the heat sink within the frame. In the embodiment shown, the two parallel sides of the U-shaped metal sheet (5) are bent outwards at angles of 90 degrees on the upper side. These surfaces contain further boreholes which can serve to attach at least one electronics housing (9) in which a circuit board (10) with a charge redistribution circuit (11) is arranged.

Figure 3:
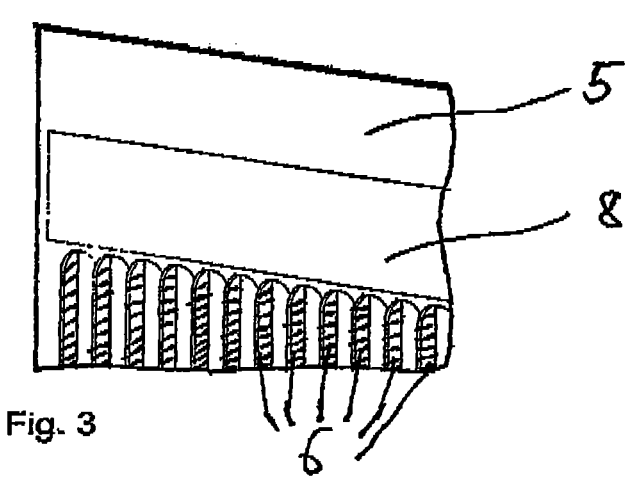
FIG. 3 shows a lateral metal sheet having sheet metal flaps bent inwards.

Another preferred embodiment is shown in FIG. 3. U-shaped sheet metal flaps (6) are cut out of a lateral metal sheet (5) of the sheet metal frame at regular intervals and bent inwards at an angle of 90 degrees. In this way, grooves are formed into which the energy storage cells (1) arranged in rigid housings (4) are inserted. In this way, the energy storage cells are positioned precisely within the sheet metal frame. On the lateral metal sheet (5), an electrically insulating foil (8) is affixed to the inside of the sheet metal frame at the same height as the current leads (2) of the energy storage cells (1). The insulating foil (8) electrically insulates the sheet metal frame from the current leads (2) of the energy storage cells (1).

Figure 4:
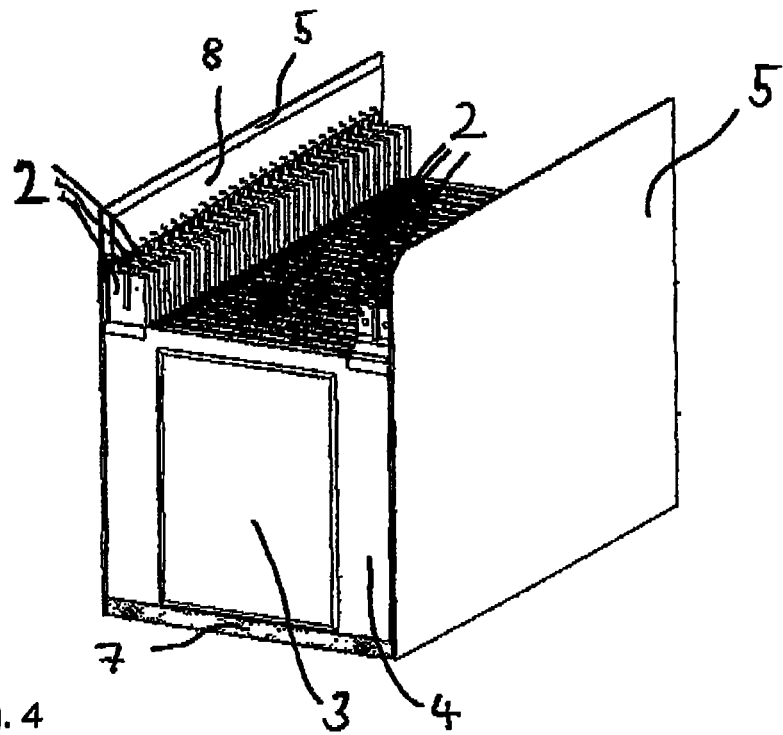
FIG. 4 shows a block of energy storage cells with a heat sink and lateral metal sheets.

FIG. 4 shows, as a preferred embodiment of the concept, two lateral metal sheets (5) which are part of the sheet metal frame in which the energy storage cells (1) arranged in rigid housings (4) are inserted and within which a heat sink (7) is arranged. In the exemplary embodiment shown, the heat sink (7) is a water cooler. The illustration makes clear that the number of energy storage cells (1) which are installed according to this concept may vary. A modular construction of a large cell block from smaller cell block units having a defined length can also be realized in this way.

Figure 5:
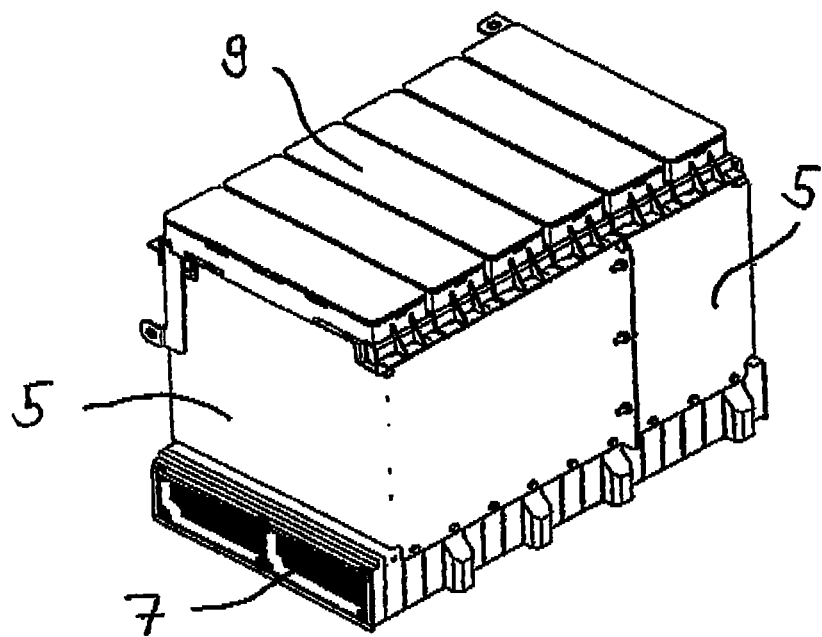
FIG. 5 shows a cell block whose frame comprises two metal sheets which have been into a U-shape having angles of 90 degrees.

FIG. 5 shows, as an alternative exemplary embodiment, a compact cell block whose sheet metal frame consists of two metal sheets (5) which are bent into a U-shape having angles of 90 degrees and screwed to each other. One of the two metal sheets (5) corresponds to that illustrated in FIG. 2. The second metal sheet is the fitting counterpart and is connected to the first one to obtain the rectangular sheet metal frame. The energy storage cells (1) arranged in rigid housings (4) are inserted in the sheet metal frame (not shown here). The sheet metal frame is connected to a heat sink (7) in the lower part. In the exemplary embodiment shown, the heat sink (7) is an air cooler. Six electronics housings (9) are attached to the upper side of the sheet metal frame in this exemplary embodiment. In each electronics housing (9), a circuit board (10) with a charge redistribution circuit (11) is arranged. The circuit (11) redistributes charge between individual energy storage cells (1) in order to increase the service life of the energy storage cells and to prevent overcharge.

FIG. 6 and FIG. 7 show the top view of the exemplary embodiment illustrated in FIG. 5, in which individual elements have been removed. Three electronics housings (9) are shown in the right half of FIG. 6. To the right thereof, an energy storage cell (1) with the current leads (2) can be seen. The current lead (2) of the positive pole of the energy storage cell (1) is led out of the cell block via a contact rail. In the left half of FIG. 6, the covers of the three electronics housings (9) have been removed. The circuit boards (10) with the charge redistribution circuits (11) can be seen. The electronics housings (9) are screwed onto the sheet metal frame.

In the illustration of FIG. 7, the electronics housings (9) have been removed completely. The rectangular shape of the sheet metal frame can be seen, which is formed of two metal sheets (5) bent into a U-shape having angles of 90 degrees. The energy storage cells (1) having flexible envelopes (3) are inserted in the sheet metal frame. In the embodiment shown, the current leads (2) of the energy storage cells (1) are welded to each other. By means of this welding, all energy storage cells are connected in series so that the total voltage of the cell block is the sum of the cell voltages. The negative pole of the energy storage cell (1) shown furthest to the left is led out of the cell block via a contact rail. The total voltage of the energy store can be picked off the two contact rails leading out of the cell block.

The invention claimed is:

1. A device for joining and storing energy storage cell assemblies, wherein each energy storage cell assembly includes an energy storage cell, a flexible envelope, metallic current leads, a rigid housing within which the energy storage cell is arranged, said rigid housing having a window opening on a planar side and two openings for the metallic current leads of the energy storage cell, said device comprising:
   a sheet metal frame in which the energy storage cells are insertable, the sheet metal frame comprising a first single metal sheet bent into a U-shape such that the first single metal sheet has a base portion and a pair of opposed arm portions extending from the base portion, the first metal sheet including a plurality of parallel grooves defined in each opposed arm portion of the first metal sheet, each groove sized to receive and support a portion of the rigid housing of a respective energy storage cell; and
   a heat sink arranged within the sheet metal frame.

2. The device according to claim 1, wherein at least one circuit board with a charge redistribution circuit, which redistributes charge between all or a group of energy storage cells, is arranged in an electronics housing within or on the sheet metal frame.

3. The device according to claim 1, further comprising the plurality of energy storage cell assemblies inserted in the sheet metal frame,
   wherein respective portions on opposed sides of the rigid housing of each energy storage cell assembly are inserted in respective opposed ones of the plurality of grooves in the first metal sheet, wherein the current leads of the energy storage cells are welded to each other.

4. The device according to claim 1, wherein an electrically insulating foil is affixed to an inside surface of the sheet metal frame at the same height as the current leads of the energy storage cells.

5. The device according to claim 1, wherein the sheet metal frame comprises a second metal sheet which is bent into a U-shape and the first and second metal sheets are connected to each other such that a frame enclosing a rectangular area is obtained.

6. The device according to claim 1, wherein the plurality of grooves are defined by a plurality of flaps cut out and bent inwardly from the opposed arm portions of the first metal sheet at regular intervals.

7. The device according to claim 1, wherein springs are arranged within the sheet metal frame in order to position the energy storage cells arranged in rigid housings.

8. The device according to claim 1, wherein the plurality of grooves extend in a direction substantially perpendicular to the direction of extension of the pair of opposed arm portions from the base portion.

* * * * *